Nov. 9, 1965  F. M. MANION  3,216,439
EXTERNAL VORTEX TRANSFORMER
Filed Dec. 18, 1962  3 Sheets-Sheet 1

INVENTOR
FRANCIS M. MANION

BY *Hurvitz & Rose*

ATTORNEYS

Nov. 9, 1965   F. M. MANION   3,216,439
EXTERNAL VORTEX TRANSFORMER
Filed Dec. 18, 1962   3 Sheets-Sheet 2

INVENTOR
FRANCIS M. MANION
BY Hurvitz & Rose
ATTORNEYS

Nov. 9, 1965     F. M. MANION     3,216,439
EXTERNAL VORTEX TRANSFORMER
Filed Dec. 18, 1962     3 Sheets-Sheet 3

INVENTOR
FRANCIS M. MANION
BY Hurvitz + Rose
ATTORNEYS

United States Patent Office 3,216,439
Patented Nov. 9, 1965

3,216,439
EXTERNAL VORTEX TRANSFORMER
Francis M. Manion, Rockville, Md., assignor to Bowles Engineering Corporation, Silver Spring, Md., a corporation of Maryland
Filed Dec. 18, 1962, Ser. No. 245,560
14 Claims. (Cl. 137—81.5)

This invention relates generally to fluid amplifier systems having no moving solid parts in which amplification is a function of the magnitude of deflection of a fluid power stream by control fluid flow. More particularly, this invention relates to a fluid amplifier utilizing the effects of interaction between a power stream and a control stream in an interaction region, a control stream being produced by a circumferential velocity-amplified rotating fluid input signal, such that a relatively small amount of energy available in the fluid input signal controls a considerably larger quantity of energy available in the power stream.

The rotating flow of fluid supplied to a control nozzle of a beam deflection type of fluid amplifier may be derived from any source capable of imparting rotation to a fluid column and the tangential component of the rotating fluid is velocity amplified by a vortex amplifier formed in the control nozzle. To facilitate an understanding of the operation of a vortex type of fluid amplifier, assume that a circular pan of liquid is provided with a small discharge orifice at the bottom center. The height of liquid in the pan results in a hydrostatic head or pressure which tends to force the fluid out of the small centrally located discharge orifice. In the case of irrotational flow the fluid will flow radially toward and through the orifice. For an incompressible fluid the flow velocity will be inversely related to the liquid radial location. If one considers a two-dimensional irrotational flow condition, as for example, in the case of flow to a conventional sink, the radial velocity $V_r$ and the radial position $r$ will be related as in Equation 1

$$V_r = \frac{\text{constant}}{r} \quad (1)$$

If the fluid is compressible then the local fluid density must be considered and Equation 1 becomes $$V_r = \frac{\text{constant}}{r} \quad (2)$$

If a tangential component of velocity is imparted to the fluid immediately adjacent to the pan rim, a fluid annulus rotates as a whole about the discharge hole as an axis, and the flow is now rotational rather than irrotational. It has been shown mathematically in text books on the subject that as this annulus shrinks toward the centrally located outlet, the circumferential velocity component $V_c$ for simple rotational flow is related to the radial position by Equation 3

$$V_c = \frac{\text{constant}}{r} \quad (3)$$

Consequently, when the fluid is discharging from the pan, as fluid moves from the rim toward the centrally located discharge orifice, its circumferential velocity component $V_c$ increases as the radial position decreases. Ideally, if one starts with a 10″ diameter pan discharging through a centrally located orifice of .01″ diameter the circumferential velocity component at the discharge orifice $V_{td}$ would be one thousand times the circumferential velocity component at the rim of the pan $V_{cc}$. Thus, the circumferential velocity component is amplified.

While an open pan of liquid has been used to describe in elementary fashion the operation of a vortex amplifier, this invention usually employs an enclosed vortex chamber, wherein the fluid need not be liquid but can be a liquid or a gas or a mixture of fluid or combinations of fluids and wherein the source of pressure causing fluid discharge is not derived from gravitational effects but is due to a flow or flows of fluid streams into the vortex chamber at a radius different from the discharge radius from a discharge orifice.

As mentioned hereinabove, a fluid vortex amplifier is formed in the control nozzle of a beam deflection fluid amplifier so as to provide velocity amplified signals to the beam unit as control signals therefor.

With respect to beam deflection types of fluid amplifiers that are employed in achieving the objects of this invention, a typical beam deflection amplifier such as disclosed in U.S. Patent No. 3,039,490 includes an interaction chamber defined in a typical case by an end wall and two outwardly diverging side walls hereinafter referred to as the left and right side walls. A nozzle hereinafter referred to as the power nozzle and having an orifice in the end wall is provided to issue a well defined stream, hereinafter referred to as a power stream, into the interaction chamber. Another nozzle, referred to as the control nozzle, has an orifice in one of the side walls and is positioned at an angle with respect to the power nozzle for issuing a stream, referred to as the control stream, into interaction with the power stream so as to effect displacement of the power stream. A V-shaped flow divider has one end thereof disposed a predetermined distance from the end wall, the sides of the divider being generally parallel to the left and right side walls of the chamber. The regions between the sides of the divider and the left and right side walls define left and right output passages, respectively.

Control signals in the form of the rotating fluid are supplied to the control nozzle, the axis of rotation of the fluid being essentially perpendicular to the direction of movement of the power stream. Variations in control stream flow result from variations in the tangential velocity and direction of rotation of the flow supplied to the control nozzle. The rotating fluid is converted by the vortex chamber formed in the control nozzle into a tangential velocity amplified vortical flow which is directed to issue as a well defined, essentially linear control stream that deflects the power stream into one output passage or the other depending upon the direction of rotation of the vortical flow in the control nozzles. The energy of the rotating flow supplied to the control nozzle is velocity amplified and the resulting velocity amplified stream controls the larger energy of the power stream so that a two fold gain is realized in the unit.

Applying the principles and teachings of this invention, the following vortical flow controlled beam deflection type of fluid amplifier units can be constructed by those skilled in the art:

(I) Amplifiers in which the control and the power streams interact in such a way that the control flow deflects the power stream, which is confined to a single plane of deflection, with little or no interaction between the side walls of the chamber in which the streams interact and the streams themselves. In such an amplifier, the detailed contours of the side walls of the chamber in which the streams interact is of secondary importance to the interacting forces between the streams themselves. Although the side walls can be used to contain fluid in the interacting chamber, and thus make it possible to have the streams interact in a region at some desired pressure, the side walls are placed in such a position that they are somewhat remote from the high velocity portions of the interacting streams. Under these conditions the flow pattern within the interacting chamber depends primarily upon the relative sizes, speeds and the directions of the control and the power streams respectively, and upon the density, viscosity, compressibility and other properties of the fluids involved as well as upon the amount of interaction occurring between the two streams.

(II) The second broad class of fluid amplifier unit that may be constructed are units wherein two or more streams interact in such a way that the resulting flow patterns and pressure distribution in the passages are greatly affected by the details of the design of the side walls. The effect of side wall configuration on the flow patterns and pressure distribution which can be achieved depends upon: the relation between width of the power nozzle supplying the fluid stream to the chamber and the distance between, opposite side walls of the interaction chamber adjacent the orifice of the power nozzle; the angle that the side walls make with respect to the center line of the power stream; the length of the side wall (when a flow divider is not used); the spacing between the power nozzle and the flow divider (if used); and the density, viscosity, compressibility and uniformity of the fluid flowing in the chamber. It also depends to some extent on the thickness of the amplifying or computing element.

In general, amplifying and computing devices utilizing boundary layer effects, i.e., effects which depend upon details of side walls configuration can be further subdivided into three categories:

(a) Boundary layer elements in which there is no appreciable "lock on" effect. Such a unit has a power gain which can be increased by boundary layer effects, but these effects are not dominant;

(b) Boundary layer units in which "lock on" effects are dominant and are sufficient to maintain the power stream in a particular flow pattern through the action of the pressure distribution arising from boundary layer effects, and requiring no streams other than the power stream to maintain that flow pattern, but having a flow pattern which can be changed to a new stable flow pattern by a change in direction of the rotating fluid flow in the control nozzle, or by altering the pressures at one or more of the output passages;

(c) Boundary layer units in which the flow pattern can be maintained through the action of the power stream alone without being continuously controlled by the control stream which flow pattern can be modified or changed by variations in the velocity or direction of the rotating stream supplied to the control nozzle. Such units maintain certain parts of the power stream flow pattern, including "lock on" to the side wall, even though the pressure distribution at the output passages is modified.

The lock-on phenomena referred to hereinabove is due to a boundary layer effect existing between the stream and a side wall. Assume initially that the fluid stream is issuing from the power nozzle and is directed toward the apex of the divider. The fluid issuing from the power nozzle orifice, in passing through the chamber, entrains fluid in the chamber and removes this fluid therefrom. If the power stream is slightly closer to, for instance, the left wall than the right wall, it is more effective in removing the fluid in the region between the stream and the left wall than it is in removing fluid between the stream and the right wall. Therefore, the pressure in the left region between the left wall and stream is lower than the pressure in the right region of the chamber and a differential pressure is set up across the power stream tending to deflect it toward the left wall. As the power stream is deflected further toward the left wall, it becomes even more efficient in entraining air in the left region and the pressure in this region is further reduced. This action is self-reinforcing and results in the power stream becoming deflected toward the left wall and entering the left outlet passage. The stream intersects the left wall at a predetermined distance downstream from the outlet of the main orifice; this point being normally referred to as the point of attachment. This phenomena is referred to as boundary layer lock on. The operation of this type of apparatus may be completely symmetrical in that if the stream had initially been slightly deflected toward the right wall rather than the left wall, boundary layer lock on would have occurred against the right wall.

Continuing the discussion of the three categories of the second class of beam type fluid amplifying units, the boundary layer unit type (a) above utilizes a combination of boundary layer effects and momentum interaction between streams in order to achieve a power gain which is enhanced by the boundary layer effects, but since boundary layer effects in type (a) are not dominant, the power stream does not of itself remain locked to the side wall. The power stream remains diverted from its initial direction only if there is a continuing control stream flow that interacts to maintain the deflection of the power stream. Boundary layer unit type (b) has a sufficient "lock on" effect that the power stream continues to flow entirely out one passage in the absence of any control signal. A boundary layer unit type (b) can be made as a bistable, tristable, or multistable unit, but it can be dislodged from one of its stable states by vortex fluid flow or by the blocking of the output passage connected to the aperture receiving the major portion of the power stream. Boundary layer units type (c) have a very strong tendency to maintain the direction of flow of the power stream through the interaction chamber, this tendency being so strong that complete blockage of the passage connected to one of the output apertures toward which the power stream is directed does not dislodge the power stream from its "locked on" condition. Boundary layer units type (c) are therefore memory units which while sensitive to interacting fluid flow, are virtually insensitive to positive loading conditions at their output passages.

To give a specific example: boundary layer effects have been found to influence the performance of a fluid amplifier element if it is made as follows: the width of the interacting chamber at the point where the power nozzle issues its stream is two to three times the width, W, of the power nozzle, i.e., the chamber width at this point is 3W; and the side walls of the chamber diverge so that each side wall makes a 12° angle with the center line of the power stream. In a unit made in this way, a spacing between the power nozzle and the center divider equal to two power nozzle widths 2W will exhibit increased gain because of boundary layer effects, but the stream will not remain locked on either side. This unit with a divider spacing of 2W is a boundary layer unit type (a) which if the spacing is less than 2W an amplifier of the first class, i.e., a proportional amplifier results. If the divider is spaced more than three power nozzle widths, 3W, but less than eight power nozzle widths, 8W, from the power nozzle, then the power stream remains locked onto one of the chamber walls and is a boundary layer type (b). Complete blockage of the output passage of such a unit causes the power stream to take a new flow pattern.

A boundary layer unit having a divider which is spaced more than twelve power nozzle widths 12W, from the power nozzle remains "locked on" to a chamber wall even though there is complete blockage of the passage connected to the aperture toward which the power stream is directed, and thus it is a boundary layer unit type (c). Another factor affecting the type of operation achieved by these units is the pressure of the fluid applied to the power nozzle relative to the width of the chamber. In the above examples, the types of operation described are achieved if the pressure of the fluid is less than 60 p.s.i. If, however, the pressure exceeds 80 p.s.i. the expansion of the fluid stream upon emerging from the power nozzle is sufficiently great to cause the stream to contact both side walls of the chamber and lock-on is prevented. Lock-on can be achieved at the higher pressures by increasing the width of the interaction chamber.

According to one embodiment of the invention, the fluid amplifier converts vortical fluid flow to substantially constricted linear flow without the use of any moving mechanical parts, the linear flow controlling the pressure distribution against the power stream so as to control the power stream flow path or direction. The side walls of the interaction chamber of the fluid amplifier serve as a solid boundary to restrict motion and flow of fluid particles within the interaction region. In consequence of the interaction that occurs between the interaction region side walls and the fluid in the power and control stream, the fluid amplifier is capable of performing amplification and switching functions without moving parts.

It is broadly an object of this invention to provide a rotating flow controlled fluid amplifier of the beam deflection type.

More specifically, it is an object of the invention to provide a fluid amplifier of the beam deflection type wherein rotating fluid flow is converted to a velocity amplified control stream flow for interacting with the power stream so as to effect displacement of the power stream.

Another object of this invention is to provide at least a partial vortex chamber within the control nozzle of a beam deflection type of fluid amplifier so that a column of rotating fluid supplied to the vortex chamber of the control nozzle will be converted to a tangential velocity amplified vortical flow and then to essentially linear flow for controlling the displacement of a power stream entering the interaction chamber of the fluid amplifier.

Yet another object of this invention is to provide a fluid amplifier of the beam deflection type wherein a vortex amplifier incorporated in a control nozzle of the beam deflection type of fluid amplifier controls the magnitude and direction of substantially linear control stream flow issuing from the control nozzle.

Still another object of this invention is to provide control flow to the control nozzles of a plurality of fluid amplifiers of the beam deflection type by one fluid vortex amplifying chamber.

The above and still further objects, features and advantages of the present invention will become apparent upon consideration of the following detailed description of several specific embodiments thereof, especially when taken in conjunction with the accompanying drawings, wherein.

Figure 1:
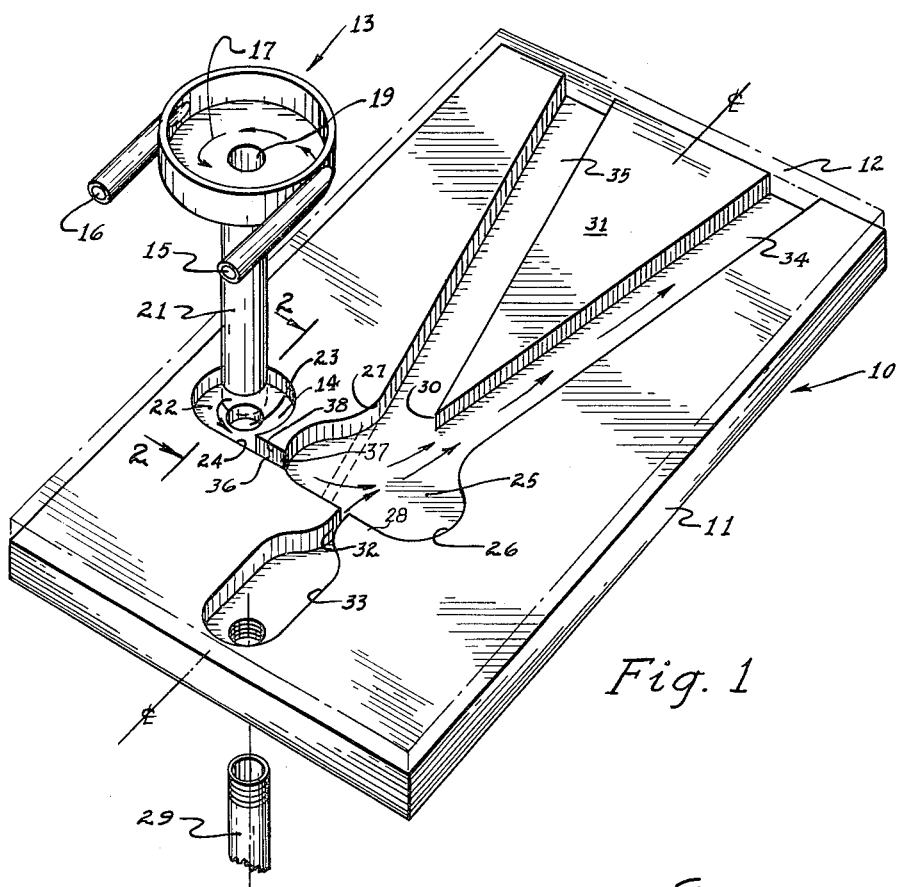
FIGURE 1 is a perspective view illustrating one possible embodiment of a beam deflection type of fluid amplifier and a vortex amplifying control nozzle in accordance with the invention.

Referring now to FIGURE 1 of the accompanying drawing for a more complete understanding of this invention, each beam deflection type of fluid amplifier, as for example the amplifier 10, is formed in a flat plate designated by numeral 11 in FIGURE 1, the plate 11 having the necessary openings, passages and cavities, formed therein by molding, milling, casting, etching or by other techniques.

A second flat plate, plate 12 in FIGURE 1, covers the plate 11, both plates being clamped, sealed, or otherwise fastened one to the other by machine screws, clamps or adhesives or by any other suitable means. For the purpose of illustration only, the two plates are shown composed of a transparent material, such as glass; however, any material compatible with the fluid employed may be used. The connection between the plates should be made fluid-tight so that the fluid flows only in defined openings, passages and cavities formed in each plate.

A vortex type of fluid amplifier designated generally by the numeral 13 may be coupled to a nozzle chamber 14 forming the main portion of the control nozzle so as to provide rotating fluid input signals thereto and may be of the type disclosed in detail in my co-pending application entitled Differential Fluid Amplifier, Serial No. 255,328, filed January 31, 1963. A pair of tubes 15 and 16 receive fluid input signals from a suitable source and supply the fluid received to the vortex chamber 17 of the vortex amplifier 13 so as to create vortical flow in the vortex chamber 17. As discussed in my aforementioned co-pending application, the pressure differentials between the input signals supplied to the tubes 15 and 16 create a vortex in the vortex chamber 17 by interacting stream momentums, the resultant vortex having a direction of rotation and circumferential velocity as it issues from an orifice 19, formed in the center of the chamber 17, that is a function of the differential in pressure between the two input streams. Other types of vortex amplifiers may alternatively be used to supply the control vortex stream to the control nozzle chamber 14.

Although the present invention has been described as a combination of a beam deflection type fluid amplifier and a vortex amplifier so that there are no moving mechanical parts in the resulting fluid system, it is to be understood that any mechanism capable of generating and supplying rotational flow to the control nozzle of the beam deflection type amplifier can be employed in the system as an alternative to a vortex amplifier.

Figure 2:
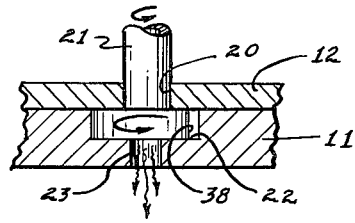
FIGURE 2 is a partial sectional side view taken through section lines 2—2 of FIGURE 1.

The column of rotating fluid egressing from the orifice 19 is received by a tube 21, which may be threadedly connected at one end thereof to the walls defining the orifice 20, FIGURE 2, the tube 21 terminating flush with the bottom surface of the plate 12, as shown. The tube 21 may also be fixed by adhesives or welding, or by any other suitable means to the plate 12 with the end thereof flush against the upper surface of the plate 12; the longitudinal axis of the tube 21 and the axis of symmetry of the orifice 20 being preferably coincident.

An orifice 23 is provided in the nozzle chamber 14, the axis of symmetry of the walls defining the orifice 23 being coincident with the axis of symmetry of the walls defining the orifice 20. At least a portion of the axial component of flow from the orifice 19 in the vortex chamber 17 can egress through the orifice 23 and from the nozzle chamber 14 in the event the quantity of fluid supplied to the nozzle chamber 14 becomes excessive. The orifice 23 is positioned centrally of the circular side walls 24 forming the periphery of the chamber 14 and the radius of the side wall 24 should be larger than the radius of the orifice 23 so that the nozzle chamber 14 is converted into a vortex amplifying chamber. The advantages of providing a vortex amplifying chamber in the control nozzle chamber 14 are that the vortex amplifier not only serves as a coupling means between the tube 21 and the beam unit but also serves to convert the static pressure in the chamber 14 to directed dynamic pressure. Consequently a greater proportion of the total energy of the rotating fluid supplied to the chamber 14 will be converted to the directed form than would be the case were the chamber 14 not a vortex amplifying device.

The circumferential component of the rotating column of fluid egressing from the tube 21 causes divergence of the rotating fluid when it is no longer confined by the tube 21 or by the walls defining the orifice 20. The fluid egressing from the tube 21 impinges against a bottom wall 22 of the nozzle chamber 14 and creates an essentially cylindrical pattern of vortical flow, having the same direction of rotation as the column in the tube 21. The diameter of the orifice 23 should not be greater than the diameter of the vortex flowing against the bottom wall 22 otherwise the tangential component will egress from the nozzle chamber 14 along with the axial component. In the embodiment illustrated, the radius of the orifice 23 is made on the order of 1½ times larger than the radius of the walls defining the orifice 19 or the tube 21 to effect proper matching between fluid inputs and fluid outputs from the nozzle chamber 14 and the chamber 25. It will be evident that the greater the size of the orifice 23, the greater the quantity of circumferential flow that also egresses from the orifice 23 along with the axial flow. Relationships which should be considered in ascertaining the optimum size of the orifice 23 include: the quantity and velocity of fluid entering the nozzle chamber 14, and the degree of tangential velocity amplification required in the nozzle chamber 14 to produce a fluid control stream of some predetermined magnitude. With regard to the latter consideration, those skilled in the art will appreciate the fact that the degree of amplification which can be effected in the chamber 14 increases as the ratio between the radius of the orifice 19 or the tube 21 and the radius of the orifice 23 increases.

The interaction chamber 25 is formed by a pair of side walls 26 and 27, an end wall 28 and the apex 30 of a flow splitter 31. An orifice 32 formed in the end wall 28 constricts fluid issuing from the power nozzle 33. A tube 29 is connected to the plate 11 for supplying a power stream to the nozzle 33, the power stream thereby issuing from the orifice 32 into one end of the interaction chamber 25. Located downstream of the chamber 25 and defined by the side walls 26 and 27 extended, and by opposite sides of the sides of the flow splitter 31 are output passages 34 and 35, respectively. As shown, the amplifier 10 is assymmetrical with respect to a center line CL taken through the apex 30 of the flow splitter 31, and the side walls 26 and 27 are set back sufficiently from the orifice 32 so that no significant boundary layer effects are created between the power stream and these side walls. Thus, the power stream issuing from the power nozzle 33 will normally enter the passage 35 unless deflected into the passage 34 by the momentum of the control flow from the nozzle 14.

As discussed hereinabove with regard to the various types of beam deflection fluid amplifiers, the position of the side walls 26 and 27 with respect to the chamber 25 and the distance between the edges of the orifice 32 and the side walls adjacent thereto governs to a great extent the operation of the amplifier 10. Thus, if the wall 27 is positioned sufficiently close to the orifice 32 as indicated by the dotted lines, so that boundary layer lock on effects are developed between the power stream and that wall, the power stream will lock onto the side wall 27 until the control stream nullifies the boundary layer effect and interacts with the power stream sufficiently to displace the power stream from the wall 27, and correspondingly from the passage 35 into the passage 34. When the control flow is removed or the magnitude thereof drops below the threshold value required to maintain the fluid stream displaced from the wall onto which it normally attaches itself, the power stream will flip back towards that wall and reattach itself thereto so that the flow issues again from the passage 35.

Were the side wall 26 not set back as shown but rather assumed a configuration and position corresponding to the dotted line configuration and position of the side wall 27, a second control flow would preferably be employed to displace the fluid stream from that side wall onto which it attaches itself.

If the flow received by the nozzle chamber 14 is essentially non-rotational in this embodiment and in the subsequently described embodiments of this invention, the orifice 23 allows egress of the non-rotating flow from the control nozzle before such flow builds up enough pressure in the control nozzle to produce a control flow that would issue from the control nozzle and interact with the power stream.

A passage 36 extends substantially tangentially from the side wall 24 to form an orifice 37 in the side wall 27 of the interaction chamber 25. A cusp 38 is formed at the point of intersection between a section of the side wall 24 and a section of one side wall of the passage 36 for scooping off a portion of the velocity amplified circumferential component of flow rotating in a counter-clockwise direction, as indicated by the arrow, into the mouth or ingress end of the passage 36. The circumferential component of rotating flow is made essentially linear by the passage 36 and the flow issues as a well defined fluid stream from the orifice 37 or egress end of the passage to interact with, and thereby displace the power stream issuing from the power nozzle 33. Should the direction of rotation of the fluid in the chamber 14 be clockwise as viewed in FIGURE 1, the passage 36 will receive no flow because of the smooth arcuate surface presented to the flow by the cusp 38. Because of the high velocity flow across the mouth of the passage 36 the pressure in the passage 36 decreases. The orifice 37 can be made large enough relative to the ingress end of the passage 36 so that the lower pressure developed in the passage 36 by the rotating flow will not create suction against the power stream sufficient to displace the power stream towards the side wall 27. Conversely, by adequately tapering the passage 36 from the mouth to the orifice 37 it is possible to develop enough of a suction pressure in the passage to pull the power stream toward the side wall 27. If the flow splitter 31 were positioned with the apex 30 thereof to the left of the orifice 32, as viewed in FIGURE 1, so that the power stream is normally directed into the passage 34, the suction developed across the orifice 37 could pull the power stream from the passage 34 into the passage 35 in the absence of over-riding boundary layer effects existing between the power stream and the side wall 26.

The velocity of the rotating fluid in the nozzle chamber 14 needed to generate an adequate control flow is therefore primarily a function of the degree of amplification effected by the nozzle chamber 14, the size and shape of the passage 36, and the mass flow rate of the power stream.

Figure 3:
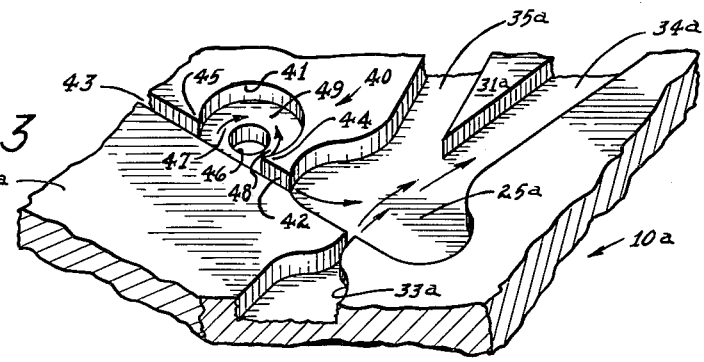
FIGURES 3, 4 and 5 are modified forms of the vortex amplifying control nozzle shown in FIGURE 1.

Referring now to FIGURE 3, there is illustrated another form of a vortex amplifying control nozzle 40, with the covering plate removed for purposes of clarity, for use in a fluid amplifier 10a. The nozzle 40 is provided with an essentially cylindrical nozzle chamber 41 having passages 42 and 43 extending substantially tangentially from the periphery of the chamber 41, the longitudinal axis of the passages 42 and 43 being in substantial alignment. A pair of cusps 44 and 45 are formed at the mouths of both passages 42 and 43 respectively, so that a portion of the rotating fluid may be received by the nozzle 40 from an orifice (not shown) formed in the flat covering plate (not shown). An egress orifice 46 is formed in a bottom wall 49 of the nozzle 40 and is in vertical alignment with the orifice (not shown) in the omitted covering plate, and has a radius considerably smaller than the radius of the chamber 41 so that the nozzle 40 is converted into a vortex amplifier. A tube, not shown, may be connected in the orifice 46 to supply flow from a source of rotating flow, the flow upon leaving the orifice 46 diverging and impinging against the bottom wall 49 with the axis of rotation thereof perpendicular to the plane of the bottom wall 49 to generate rotating flow in the nozzle chamber 41. If a tube (not shown) is inserted completely into the orifice 46 spacing should be provided between the end of the tube and the bottom wall 49 to permit divergence of the rotating flow from the tube end. Flow in the direction of arrow 48 will not ordinarily be received by the passage 43 because no projection exists for scooping flow into that passage, and flow in the direction of the arrow 47 will not be scooped into the passage 42 for the same reason. The velocity amplifier circumferential portion of the component of flow rotating in a direction indicated by the arrow 48 will however be scooped off by the cusp 44 into the passage 42 and a portion of the velocity amplified circumferential component of flow rotating in the direction of the arrow 47 will be scooped into the ingress end of the passage 43 by the cusp 45.

Figure 5:
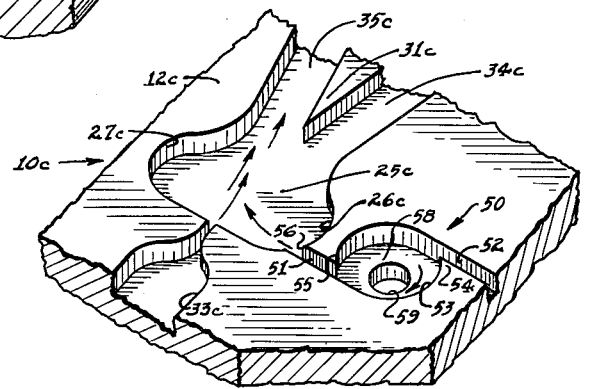

A tank (not shown) or other suitable receptacle under a static pressure less than that within the nozzle 40 may be positioned to receive the fluid issuing from the passage 43. It is necessary that the backloading of the passage 43 be less than the static pressure developed by the flow in the nozzle chamber 41 otherwise flow may enter the nozzle 40 from the passage 43 or impede the bleeding-off of fluid from the nozzle chamber. The passage 42 receives the velocity amplified circumferential flow of the vortex rotating in the direction of arrow 48 and converts this flow into a substantial linear stream which issues from the passage 42 as a fluid control signal. The control signal is received by the interaction chamber 25a and deflects the power stream issuing from the power nozzle 33a by momentum exchange from the passage 35a into the passage 34a as shown by the arrows. While the amplifier is illustrated as a typical class 1 type of fluid amplifier, it may also be made into a class 2 type amplifier by modifying the side walls of the interaction chamber 25a as discussed in relation to the amplifier 10 of FIGURE 1. Also, by providing a proper taper to the passage 42 the suction developed at the egress end of that passage by flow in the direction of the arrow 47 may be utilized to switch the power stream from the passage 34a into the passage 35a, assuming that the power stream is normally directed into the passage 34a by assymmetrically positioning the flow splitter 31a as shown in FIGURE 5. Depending upon the magnitude of the suction that can be developed, the side walls of the chamber 25a may be positioned to either permit or prevent the existence of boundary layer effects between the power stream and the side walls.

Figure 4:
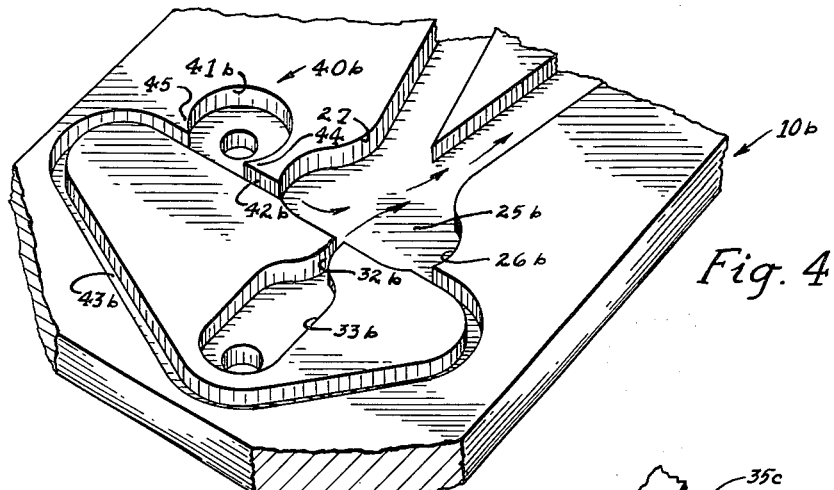

In FIGURE 4 an amplifier 10b has an output passage 43b connected to the control nozzle 40b of similar design to that of the nozzle 40 of FIGURE 3, the passage 43b being designed as a loop that discharges constricted flow from a side wall 26b of an interaction chamber 25b. The side walls 26b and 27b are positioned sufficiently close to the orifice 32b of the power nozzle 33b so that boundary layer effects can be created between the power stream and the side walls 26b and 27b. In this embodiment, the passages 42b and 43b taper from the ingress ends of the passages adjacent the cusps 44 and 45 so that negative pressures of relatively small magnitude are developed in one passage 42b or 43b, depending upon the direction of flow rotation in the chamber 41b, while the other passage is simultaneously issuing a positively pressurized fluid control stream. The negative pressure in the one passage is fed back to aid the deflection of the power stream toward the one side wall 26b or 27b, to which the power stream is displaced by the egressing fluid from the other passage. The side walls 26b and 27b may be set back remotely from the orifice 32b so that displacement of the power stream by control flow is effected solely by momentum exchange.

FIGURE 5 illustrates another embodiment of a fluid amplifier 10c the control nozzle of this amplifier being designated by the numeral 50. In this particular embodiment, the passages 51 and 52 extend substantially tangentially from the periphery of the cylindrical nozzle chamber 53 of the nozzle 50, the ingress ends of the passages 51 and 52 being preferably located diametrically opposite each other so that cusps 54 and 55, respectively, intercept and scoop off successive portions of the velocity amplified tangential component of flow rotating in a clockwise sense of direction into the passages 51 and 52, respectively. The fluid issuing from the taper egress end of the passage 51 issues from an orifice 56 formed in the side wall 26c of an interaction chamber 25c so that the power stream issuing from the power nozzle 33c can be deflected by control fluid streams issuing from the orifice 56. The flow splitter 31c is asymmetrically positioned relative to the side walls 26c and 27c so that the power stream from the power nozzle 33c is normally directed into the output passage 34c, the power stream being deflected into the passage 35c by constricted control stream flow issuing from the orifice 56.

An orifice 58 extending perpendicularly through the plate 12c receives the rotating input flow and directs a portion of the axial component of this flow into a concentrically aligned egress orifice 59 that extends through the plate 11c and is located centrally of the walls defining the nozzle chamber 53. The relationships between, and the purposes for the orifices 58 and 59 are the same as that of the orifices 20 and 23 respectively, of the amplifier 10 (FIGURE 1). The passage 52 may also be tapered and the linear flow issuing from the passage 52 may be employed in the control nozzles of other beam type fluid amplifiers as will be subsequently discussed in detail.

In the event flow in the nozzle chamber 53 is counterclockwise in direction as viewed in FIGURE 5, the orifice 59 can serve as an egress for the flow and if the passage 51 is tapered the suction created in the passage 51 by the flow across the arcuate edge of the cusp 55 will tend to pull the power stream into the passage 34c and thereby aid in the restoration of flow into that passage. The control nozzle 50 may be alternatively embodied in a class 1 type of fluid amplifier (FIGURE 3) to effect displacement of the power stream, and the egress end of either passage 51 or passage 52 may terminate in an orifice formed in a side wall of the interaction chamber so as to effect displacement of a power stream.

Figure 6:
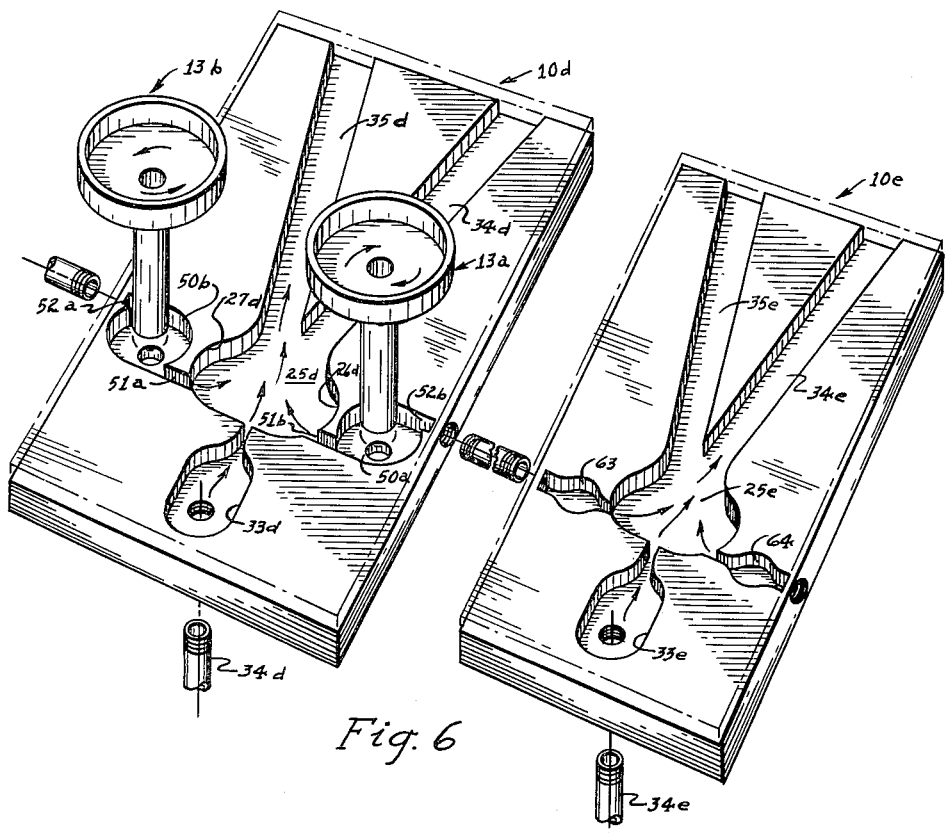
FIGURE 6 illustrates two beam deflection types of fluid amplifiers intercoupled so that a single vortex amplifier provides control fluid streams for both amplifiers.

FIGURE 6 shows a stacking arrangement of two beam deflection type fluid amplifiers 10c and 10e so that the velocity amplified tangential component of flow from the vortex amplifiers 13a and 13b supplied to the control nozzles 50a and 50b can be used to control the deflection of the power stream in both amplifiers. The control nozzles 50a and 50b are of the type shown in FIGURE 5, wherein clockwise rotating flow in the nozzle 50a and counterclockwise rotating flow in the nozzle 50b will create defined linear flow control streams that displace the power stream issuing from the power nozzle 33d. Since the amplifier 10d is symmetrical, the overriding control stream issuing from one side wall of the amplifier 10d will cause deflection of the power stream into one of the output passages 34d or 35d respectively, associated with that side wall. A portion of the rotating flow is also scooped into the passages 52a and 52b, this fluid entering the control nozzles 63 and 64 of the amplifier 10e as essentially a linear control flow. The overriding control fluid stream issuing from the nozzle 63 or 64 will similarly cause the power stream issuing from the power nozzle 33e to flow into an opposite output passage 34e or 35e communicating with the interaction chamber 25e, the power nozzles 33d and 33e receiving fluid from the input tubes 34d and 34e, respectively. It should be evident that the control nozzle 50a might be connected to the control nozzle 64 instead of to the control nozzle 63, and the control nozzle 50b connected to the control nozzle 63, whereupon the fluid output flows would issue from corresponding output passages 34d and 34e or 35d and 35e of the amplifiers 10d and 10e, respectively.

Figure 7:
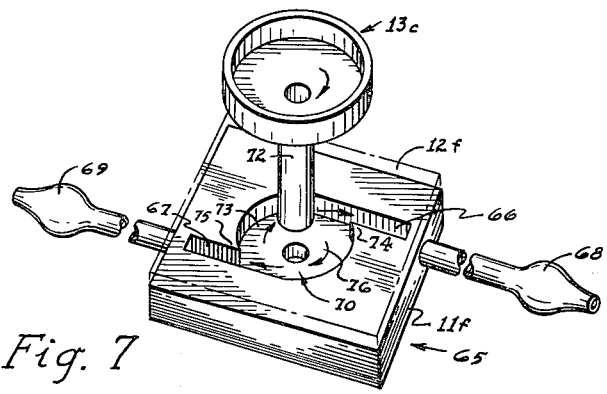
FIGURE 7 illustrates a vortex amplifier for supplying control fluid streams to at least two control nozzles.

If it is desired to position the rotating fluid generating means, remote from the beam deflection type of fluid amplifiers and yet control in whole or in part the operation of the beam deflection amplifier, a vortex amplifying unit such as shown in FIGURE 7 can be provided. The unit, designated by the numeral 65, has the output passages 66 and 67 thereof coupled to control nozzles 68 and 69, respectively, by tubing or other suitable connecting means and receives rotating input signals from a vortex amplifier 13c. A substantially cylindrical vortex chamber 70 and the passages 66 and 67 are formed in a flat plate 11f and an egress orifice 71 extends perpendicularly through the plate 11f and is located centrally of the chamber 70. The radius of the walls defining the orifice 71 is considerably less than the radius of the wall defining the chamber 70 and therefore the tangential velocity component of flow is amplified when a rotating input flow is supplied to the unit 65.

A flat covering plate 12f is sealed to the plate 11f by any suitable means, and a tube 72 extends substantially perpendicularly through the plate 12f, one end of the tube 72 terminating flush with the bottom surface of the plate 12f and the other end receiving flow from the vortex amplifier 13c. The longitudinal axis of the tube 72 and the axis of symmetry of the walls defining the orifice 71 are preferably coincident so that the axis of the rotating flow supplied to the chamber 70 is essentially concentric with the axis of symmetry of the orifice 71. Fluid egressing from the lower end of the tube 72 diverges before impinging against the bottom wall 73 of the chamber 70 because of the spacing between the lower end of the tube 72 and the bottom wall 73. A pair of cusps 74 and 75 are positioned to intercept and scoop off into the output passages 66 and 67 a portion of the tangential component of the flow rotating in the direction of the arrow 76. Obviously, the quantity of flow received by each passage is determined by the position of the cusps relative to the side walls of the chamber 70 and the flow travels substantially linearly through the passages 66 and 67 into the nozzles 68 and 69, respectively. The nozzles 68 and 69 may be employed as desired as control or power nozzles for beam deflection types of fluid amplifiers, or the nozzles may be dispensed with and the flow from the unit 65 may be used for controlling or operating other types of systems or devices (not shown). Counterclockwise and non-rotating or axial flow supplied to the chamber 70 egresses from the orifice 71, the counterclockwise flow may also be used to control or operate similar or different systems or devices as will be apparent to those skilled in the art.

In summary, since the tangential component of vortical flow is linearized and used to effect displacement of a relatively larger energized power stream in the beam deflection amplifier, a gain is realized in addition to the gain that is realized by the amplification of the tangential component of the signal supplied to the vortex amplifying control nozzle. Thus whenever the control nozzle in a beam deflection type of pure fluid amplifier is designed to provide at least a partial vortex amplifier, two stage amplification of the input signal is achieved.

While I have described and illustrated several specific embodiments of my invention, it will be clear that variations of the details of construction which are specifically illustrated and described may be resorted to without departing from the true spirit and scope of the invention as defined in the appended claims.

I claim:
1. A nozzle for use in a fluid system comprising at least a partial vortex amplifier for creating vortical flow from rotating flow supplied thereto said vortex amplifier including a chamber formed by at least a partial, substantially circular peripheral side wall and a bottom wall, said bottom wall having an egress orifice therein located substantially centrally of said side wall and having a radius considerably less than the radius of said side wall, said side wall having an opening formed therein through which the velocity amplified tangential component of vortical flow can egress from said chamber, a passage extending substantially tangentially from said side wall and communicating with the opening for receiving a portion of the velocity amplified tangential component of vortical flow and for converting the portion so received into a substantially linear fluid stream.

2. A control nozzle for use in a fluid amplifying system, the system including a flow interaction chamber for receiving and confining a defined power stream flow to one plane, said nozzle comprising at least a partial cylindrical vortex chamber including a peripheral side wall section and a bottom wall having an egress orifice formed centrally therein, the radius of the orifice being considerably less than the radius of said side wall, said vortex chamber receiving rotating flow such that the axis of rotation of the rotating flow is in substantial alignment with the geometrical center of said orifice, plural passages having flow ingress and egress ends, said passages extending substantially tangentially from said peripheral side wall, the ingress ends of said passages communicating with the interior of said chamber for receiving portions of the velocity amplified tangential component of rotating flow therefrom and for converting the portions received into substantially linear and defined fluid control jets, at least one of the egress ends of said passages being positioned to discharge a control jet into the chamber to displace the power stream flowing therein by interaction therewith.

3. The control nozzle as claimed in claim 2, wherein the ingress ends of said passages in said vortex chamber are in substantial alignment.

4. The control nozzle as claimed in claim 2, wherein the ingress ends of said passages are positioned substantially diametrically opposite each other.

5. The control nozzle as claimed in claim 2, wherein a cusp-shaped wall section is formed proximate the ingress ends of said passages for intercepting and scooping off a portion of the vortical flow into each passage.

6. The control nozzle as claimed in claim 2, wherein the interaction chamber is formed with a pair of opposed side walls, and wherein said egress ends of said passages communicate with said interaction chamber through opposed side walls.

7. The control nozzle as claimed in claim 6, wherein the egress end of one passage is positioned in one side wall substantially opposite the egress end of another passage positioned in an opposite side wall.

8. A nozzle for use in a fluid system comprising at least a partial vortex chamber, said vortex chamber including a section of a substantially circular peripheral side wall and a bottom wall, said bottom wall having an orifice located substantially centrally therein through which fluid can egress from said chamber, the radius of said orifice being considerably smaller than the radius of said side wall so that rotating flow supplied to said chamber with the axis of rotation in substantial alignment with the geometrical center of said orifice is converted to tangential velocity amplified vortical flow in said vortex chamber, at least one passage extending substantially tangentially from an opening formed in said side wall of said vortex chamber, and a cusp formed at the opening for scooping off a portion of the vortical flow into the passage.

9. A fluid amplifier system comprising plural fluid amplifiers of the beam deflection type, each amplifier including an interaction chamber having a pair of side walls and a power nozzle for issuing a stream into one end of said chamber between said side walls, and vortex amplifier means for receiving and converting rotating flow to a velocity amplified, substantially linear flow, said vortex amplifier means communicating with each interaction chamber such that linear flow therefrom interacts with the stream to effect displacement thereof in each amplifier.

10. A fluid amplifier system comprising: a fluid amplifier of the beam deflection type including an interaction chamber having a pair of side walls, a power nozzle for issuing a defined power stream into one end of said chamber between said side walls, said interaction chamber confining power stream flow to one plane, and at least one control nozzle disposed with respect to said power nozzle for issuing a defined control fluid stream into said interaction chamber across the power stream for effecting amplified directional displacement of the power stream, vortex amplifying means formed in said one control nozzle for receiving and amplifying the tangential velocity component of rotating flow supplied thereto, said one control nozzle connecting the velocity amplified tangential component of flow to a defined, substantially linear control stream, and plural passages located downstream of said interaction chamber for receiving fluid resulting from the interaction between the power and control streams.

11. The fluid amplifier system as claimed in claim 10, wherein said vortex amplifying means comprises a substantially cylindrical chamber including a peripheral side wall, and at least one passage having the entrance thereof formed in said side wall so as to receive the velocity amplified tangential component of rotating flow from said cylindrical chamber, said control nozzle being connected to said one passage for receiving substantially linear flow therefrom.

12. The fluid amplifier system as claimed in claim 11, wherein said cylindrical chamber is provided with a bottom wall having an orifice formed substantially centrally therein through which the axial component of rotating flow can egress from said cylindrical chamber, the radius of the orifice being smaller than the radius of said side wall.

13. A fluid amplifier of the beam deflection type, the amplifier including: an interaction chamber having a pair of side walls, a power nozzle for issuing a power stream into one end of said interaction chamber between said side walls, said interaction chamber confining power stream flow in one plane of movement; a substantially cylindrical vortex chamber formed in said amplifier for receiving rotating fluid flow and having an axis of symmetry, said vortex chamber having an egress orifice located in said axis of symmetry, the radius of said vortex chamber being considerably greater than the radius of said egress orifice so that the tangential velocity component of rotating flow is velocity amplified in said vortex chamber, plural passages having respective ingress and egress ends at the extremities thereof, the ingress ends extending substantially tangentially from the periphery of said vortex chamber and communicating therewith through an opening formed in the periphery thereof, said ingress ends receiving portions of the velocity amplified tangential component of vortical flow and converting the tangential component of vortical flow to substantially linear streams, the egress ends of said passages communicating with opposite side walls so as to issue the linear streams as opposing control streams into said interaction chamber in interacting relationship with the power stream so as to effect amplified directional displacement of the power stream.

14. The fluid amplifier as claimed in claim 13, wherein said passages taper from said ingress to said egress ends.

References Cited by the Examiner
UNITED STATES PATENTS

| | | | |
|---|---|---|---|
| 2,942,684 | 6/60 | Bennett | 181—58 |
| 3,075,227 | 1/63 | Bowles | 15—346 |

LAVERNE D. GEIGER, *Primary Examiner.*